(12) United States Patent
Wiedenbauer et al.

(10) Patent No.: US 10,199,928 B1
(45) Date of Patent: Feb. 5, 2019

(54) SOFT START OF SWITCHED CAPACITOR CONVERTERS BY REDUCING VOLTAGE PROVIDED BY INITIAL POWER SWITCH

(71) Applicant: Infineon Technologies Austria AG, Villach (AT)

(72) Inventors: Otto Wiedenbauer, Villach (AT); Christian Rainer, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/875,790

(22) Filed: Jan. 19, 2018

(51) Int. Cl.
| | |
|---|---|
| *H02M 3/06* | (2006.01) |
| *H02M 1/36* | (2007.01) |
| *H02M 3/158* | (2006.01) |
| *H02H 9/02* | (2006.01) |
| *H02M 1/00* | (2006.01) |

(52) U.S. Cl.
CPC ............ *H02M 3/06* (2013.01); *H02M 1/36* (2013.01); *H02M 3/158* (2013.01); *H02H 9/025* (2013.01); *H02M 2001/0003* (2013.01)

(58) Field of Classification Search
CPC ...... H02M 1/083; H02M 1/15; H02M 3/1588; H02M 3/07; H02M 3/335; H02M 2001/0058; H02M 2001/007
See application file for complete search history.

(56) References Cited

U.S. PATENT DOCUMENTS

| | | | |
|---|---|---|---|
| 8,503,203 B1 | 8/2013 | Szczeszynski et al. | |
| 9,653,986 B2 | 5/2017 | Zhak et al. | |
| 9,917,517 B1 * | 3/2018 | Jiang ........................ | H02M 1/14 |

\* cited by examiner

*Primary Examiner* — Emily P Pham
(74) *Attorney, Agent, or Firm* — Murphy, Bilak & Homiller, PLLC

(57) ABSTRACT

Circuits and methods are provided for soft-starting a switched-capacitor converter (SCC), so as to limit inrush current at the start-up of the SCC. This is accomplished by using the first power switch of the SCC, i.e., the switch coupled to the input of the SCC, to reduce the voltage provided at the SCC input, such that the full input voltage is not directly applied to the SCC circuitry downstream from the first power switch during the SCC start-up. The reduced voltage provided to the SCC circuitry (other than the first power switch) serves to limit the current drawn by the remainder of the SCC circuit during the SCC start-up. This reduced voltage begins at zero and ramps to the voltage provided at the SCC input. Once the reduced voltage reaches the input voltage level, steady-state operation of the SCC may begin.

22 Claims, 9 Drawing Sheets

SOFT START OF SWITCHED CAPACITOR CONVERTERS BY REDUCING VOLTAGE PROVIDED BY INITIAL POWER SWITCH

TECHNICAL FIELD

The present application relates to switched-capacitor converters (SCCs) and, in particular, relates to circuit topologies in which an initial current flowing through an SCC at power up is limited by reducing a voltage at the first switch of the SCC.

BACKGROUND

A switched-capacitor converter (SCC) is a type of direct-current (DC) to DC voltage converter that achieves high efficiency and high power density by using switches and capacitors to transfer power from an input power supply to an output. An SCC includes a rectifier at its output, and a series of power switches interposed between the input power supply and the rectifier. Such an SCC further includes one or more legs, each of which includes at least a capacitor that couples one of the switches to the rectifier. The switches are controlled such that charge is transferred to and from the capacitor within each leg so that, for a step-down SCC, the voltage of the input power supply is down-converted to provide a reduced voltage at the output of the SCC. Some of the legs may also include inductors connected in series with the capacitors so as to provide a resonance that enables efficient soft-switching of the switches.

At the initiation of a start-up (power-up) of an SCC, the voltages across the capacitors within the SCC are typically zero, i.e., the capacitors are in a discharged state prior to application of an input power supply to the SCC. During steady-state operation of the SCC, however, each capacitor maintains an average voltage across it, together with some ripple associated with the energy transfers within the SCC. The discharged capacitors can cause a problem in that current flow through the SCC may spike to very high levels, sometimes termed "inrush current," upon application of the input power supply to the SCC as the capacitors are charged at start-up to the average voltages necessary for steady-state operation of the SCC. This high start-up current causes electrical stress that can damage the SCC components, including the switches, capacitors and inductors. Additionally, the high start-up current can cause problematic dips in the voltage of the input power supply and/or lead to unwanted triggering of overcurrent protection circuits. The inrush current should be limited to prevent these problems.

One solution for limiting the current at the start-up of the SCC is to ramp up the voltage that is provided to the SCC input by the input power supply. For example, a current-limiting circuit may be placed between the input power supply and the SCC input, wherein the current limiting circuit includes a shunt resistor placed in parallel with a power switch. During start-up, the shunt resistor limits the current flowing into the SCC. Upon reaching steady-state operation of the SCC, the power switch is turned on to bypass the shunt resistor. While such a solution addresses the inrush current problem, it comes at the expense of adding an additional power switch to the SCC. In addition to the cost and size of the power switch, requiring current to flow through another power switch during steady-state operation reduces the efficiency of the SCC.

Another solution is to pre-charge the capacitors within an SCC to their desired steady-stage average voltages during the start-up phase of the SCC. Such pre-charging may involve additional pre-charging circuitry and/or special control of the switches within the SCC during the start-up phase. More particularly, this pre-charging often requires that voltages across the SCC capacitors be sensed so that the switches may be appropriately controlled to ensure each capacitor is charged to its desired (steady-state) voltage. While pre-charging circuitry and control may be feasible for an SCC that is monolithically integrated, such pre-charging becomes considerably more complex for high-power SCCs that typically require discrete power switches. In any case, capacitor pre-charging requires additional circuit and control complexity, and often requires additional current limiting as described in the above solution, all of which is undesirable.

Circuits and associated techniques are desired for limiting inrush current while requiring minimal additional circuitry, requiring low complexity, and minimizing power losses.

SUMMARY

According to an embodiment of a switched-capacitor converter (SCC), the SCC converts power provided at an input into power provided to an output. The SCC input is coupled to an input power supply while the SCC output is coupled to a load of the SCC. The SCC includes a rectifier at its output, a first switch stage, a first capacitor, a controller, an input activation detector, a voltage ramp generator, and a soft-start circuit. The first switch stage comprises first and second switches which are connected in series and interposed between the input and the rectifier. The first switch has a first terminal which is coupled to the input, a second terminal which is coupled to the second switch, and a control terminal. The first capacitor couples the first switch stage to the rectifier. The controller is operable to generate first and second control signals for controlling, respectively, the first and second switches, such that the first and second switches are alternately switched. The input activation detector generates an input activation signal responsive to detecting that power is being supplied at the input, as indicated by a voltage at the input. In response to the input activity detection signal, the voltage ramp generator generates a ramped voltage that increases from zero to a maximum ramp voltage, which is typically equivalent to the steady-state voltage provided at the input. The slope of the ramped voltage is controlled to be less than a slope of the input voltage occurring at the activation of the input power supply. The soft-start circuit sets a voltage at the second terminal of the first switch based upon the ramped voltage, such that the current through the SCC is limited based upon this ramped voltage.

According to an embodiment of a method, the method provides for limiting the current within a switched-capacitor converter (SCC) during its start-up. The SCC includes an input, an output, a rectifier at the output, a first switch stage including first and second switches connected in series and interposed between the input and the rectifier, and a first capacitor interposed between the first switch stage and the rectifier. The first switch has a first terminal which is coupled to the input, a second terminal which is coupled to the second switch, and a control terminal. The method includes a first step of detecting that an input voltage at the input has risen above an activation threshold which indicates that power is being supplied to the SCC. In response to such detecting, a ramp voltage is generated wherein the ramp voltage has a slope that is less than a slope of the input voltage as it rises during activation of the input. The ramp voltage, or a variation thereof, is then applied such that it controls a voltage at the second terminal of the first switch, thereby limiting the current flow through the SCC. The ramp voltage increases from zero to a maximum ramp voltage, which is typically a steady-state voltage at the input, during the start-up phase of the SCC. Subsequently, steady-state operation of the SCC may begin.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

Figure 1:
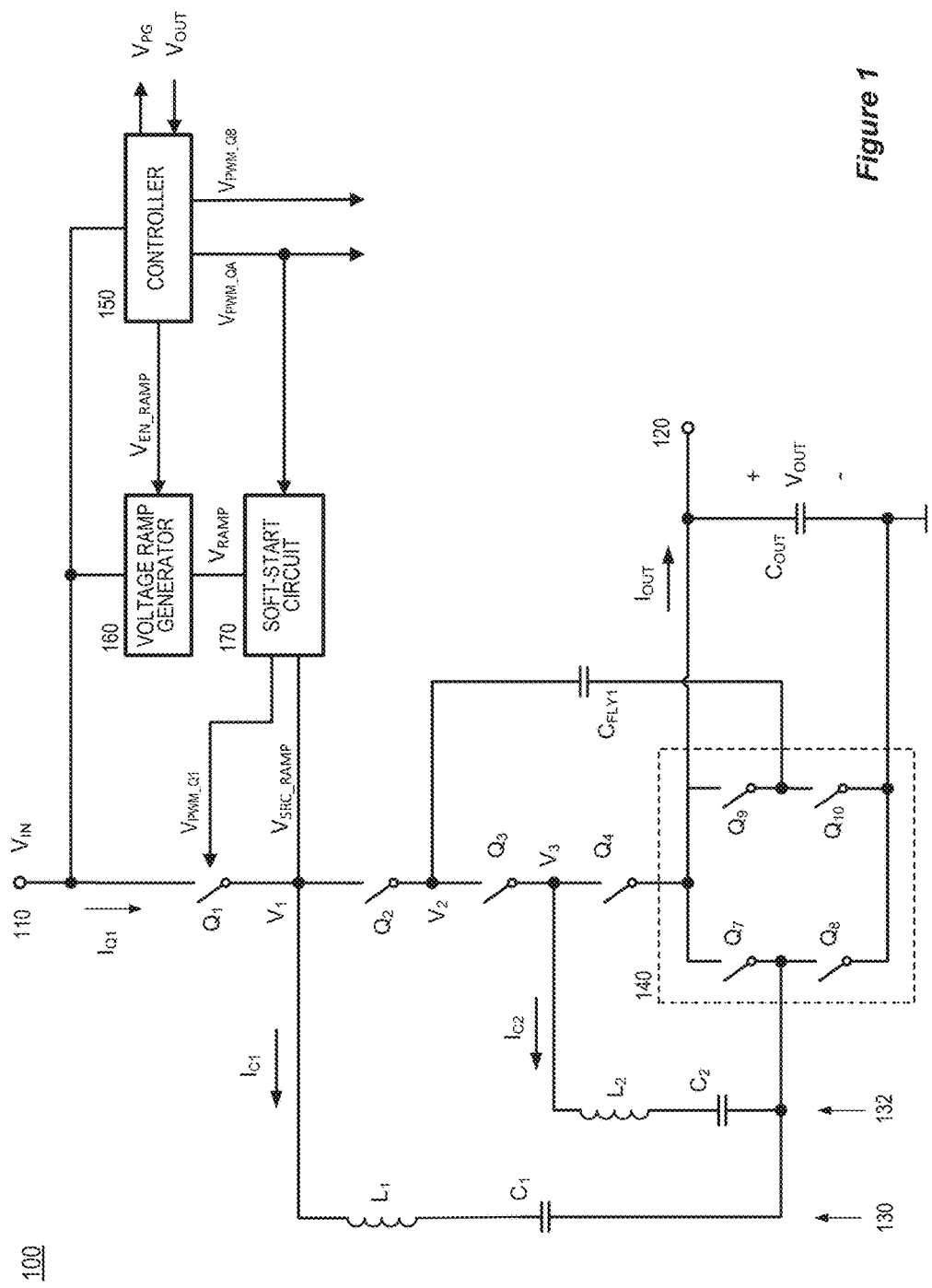
FIG. 1 illustrates a schematic diagram of a switched-capacitor converter (SCC) that includes circuitry for limiting current flow during a start-up phase of the SCC.

The embodiments described herein provide circuits and methods for limiting the current flow within a switched-capacitor converter (SCC) during a start-up phase before the SCC enters steady-state operation. This is achieved by limiting the voltage supplied at a first switch of the SCC to the remainder of the SCC circuitry, wherein this first switch connects to the SCC input at a first terminal and to the remainder of the SCC circuitry at a second terminal. The supplied voltage is generated by a voltage ramp generator and applied to the first switch by a soft-start circuit, under the control of an SCC controller, such that a voltage at the second terminal of the first switch is limited. The described techniques do not require ramping of the voltage that is provided to the SCC input and to the first terminal of the first switch of the SCC, and do not require the current-limiting circuitry often associated with such ramping. Hence, the described techniques avoid the power loss and cost associated with an additional power switch that is typically included in such circuitry. Furthermore, the described techniques avoid the complex control and/or additional circuitry required by capacitor pre-charging circuits.

Rather than using any additional power switch(es), or complex voltage sensing and switch sequencing for capacitor pre-charging, the described techniques use the first power switch and a ramp voltage to limit the current of the SCC during its start-up. Control of the SCC switches during the start-up phase is largely the same as during steady-state operation of the SCC, i.e., no special sequencing of the switches is required. While the techniques are described using a first switch within particular SCC circuits, it should be understood that the techniques can be readily applied to use the first switch within other SCC circuits. Within this context, the first switch is considered the switch that is connected to the input power supply.

The inventions are described below by way of particular examples. This description begins with an embodiment of an SCC that steps down an input voltage by a factor of four, i.e., a 4:1 SCC. While the illustrated examples focus on a 4:1 SCC, it should be understood that the described techniques may be readily extrapolated to other SCC circuits including those that down-convert an input voltage by 2:1, 6:1, 8:1, etc. The 4:1 SCC embodiment begins with a description of the circuitry used for implementing such a converter, including a voltage ramp generator, an SCC controller, and a soft-start circuit coupled to the first switch of the SCC. This description is followed by more detailed descriptions of the soft-start circuit and the voltage ramp generator. Some alternative SCC topologies are presented next. Finally, a method for limiting the current during a start-up phase of an SCC is described.

It should be understood that the examples described below are not meant to be limiting. Circuits and techniques that are well-known in the art are not described in detail, so as to avoid obscuring the unique aspects of the invention. Features and aspects from the example embodiments may be combined or re-arranged, except where the context does not allow this.

Switched-Capacitor Converter with Current Limiting During Start-Up

FIG. 1 illustrates an embodiment of a switched-capacitor converter (SCC) 100 that limits current flow during a start-up phase. The illustrated SCC 100 down-converts the voltage $V_{IN}$ provided at an input 110 by a factor of four to provide a voltage $V_{OUT}$ at an output 120. The down-converted voltage $V_{OUT}$ provided at the output 120 is typically an intermediate voltage, within a system, that must be stepped down further before being supplied to a load such as, e.g., a memory, a central processing unit (CPU). While not shown for ease of illustration, a switching DC/DC converter or a linear regulator coupled to the SCC output 120 may provide this further step-down in voltage, and also provide regulation that is not provided by the SCC 100. In other applications, the down-converted voltage $V_{OUT}$ provided by the SCC 100 may be used directly by a load.

The illustrated SCC 100 includes first and second switches $Q_1$, $Q_2$, which are part of a first switch stage, and third and fourth switches $Q_3$, $Q_4$, which are part of a second switch stage. A rectifier 140 is interposed between the fourth switch $Q_4$ and ground, and provides a rectified voltage $V_{OUT}$ across a filter capacitor $C_{OUT}$ at the output 120. The illustrated rectifier 140 includes switches $Q_7$ and $Q_8$, which form a first half-bridge rectifier branch, and switches $Q_9$ and $Q_{10}$, which form a second half-bridge rectifier branch. An output current $I_{OUT}$ is provided by the rectifier 140 to the filter capacitor $C_{OUT}$ and the output 120.

The SCC 100 further includes a first leg 130 that couples the node $V_1$ connecting the first and second switches $Q_1$, $Q_2$ to the rectifier 140, and a second leg 132 that couples the node $V_3$ connecting the third and fourth switches $Q_3$, $Q_4$ to the rectifier 140. The first leg 130 includes a first capacitor $C_1$ and a first inductor $L_1$, and has a current $I_{C1}$ flowing through it. The second leg 132 is similarly configured to include a second capacitor $C_2$ and a second inductor $L_2$, and has a current $I_{C2}$ flowing through it. The inductors $L_1$, $L_2$ within the SCC 100 form, in combination with the capacitors $C_1$, $C_2$, resonant tanks which enable soft-switching of the switches if the switching is performed at a corresponding resonant frequency. The inductors $L_1$, $L_2$ may be omitted in SCC circuits that are not attempting to achieve such soft-switching. The SCC 100 additionally includes a flying capacitor $C_{FLY1}$, which couples the node $V_2$ connecting the second and third switches $Q_2$, $Q_3$ to the rectifier 140.

The switches within the switch stages and the rectifier 140 may be partitioned into two groups, termed group A and group B herein. For the illustrated SCC 100, switches $Q_1$, $Q_3$, $Q_7$, and $Q_{10}$ are in group A, whereas switches $Q_2$, $Q_4$, $Q_8$, and $Q_9$ are in group B. During steady-state operation of the SCC 100, the switches of group A are switched together, and the switches of group B are switched together. The switching of the group A switches alternates with the switching of the group B switches. During a first phase of a switch cycle, the group A switches are enabled so as to charge the capacitors $C_1$, $C_2$ within the first and second legs, while discharging the flying capacitor $C_{FLY1}$. (The capacitor $C_1$ is charged from the input 110 via the first switch $Q_1$, and the capacitor $C_2$ is charged from the flying capacitor $C_{FLY1}$ via the third switch $Q_3$.) During a second phase of the switch cycle, the flying capacitor $C_{FLY1}$ is charged, and the first and second capacitors $C_1$, $C_2$ are discharged. (The flying capacitor $C_{FLY1}$ is charged from the capacitor $C_1$ via the second switch $Q_2$, and the capacitor $C_2$ is discharged to the filter capacitor $C_{OUT}$ and the output 120 via the fourth switch $Q_4$.) During steady-state operation of the SCC 100, the expected voltages across the capacitors within the first, second, and flying legs are as follows:

$$V_{C2}=1*V\text{out},$$

$$V_{FLY1}=2*V\text{out},$$

$$V_{C1}=3*V\text{out}.$$

Further detail regarding steady-state operation of an SCC will not be provided, as such operation is well-known in the art.

The switches $Q_1, \ldots Q_4, Q_7, \ldots Q_{10}$ illustrated in the SCC 100 of FIG. 1 are power metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The switches $Q_1, \ldots Q_4$, $Q_7, \ldots Q_{10}$ may be integrated on the same semiconductor die, may each be provided on separate dies, or may otherwise be spread across a plurality of semiconductor dies. (For high-power SCCs, the power switches often need to be provided on separate dies.) Each of the switches $Q_1, \ldots Q_4$, $Q_7, \ldots Q_{10}$ within the SCC 100 has drain and source terminals, as well as a gate terminal that controls conduction between the drain and source. (For ease of illustration, these terminals are not explicitly shown in FIG. 1.) A control signal is provided to each of the gate terminals via a driver, which is also not shown for ease of illustration.

The SCC 100 includes a controller 150, a voltage ramp generator 160, and a soft-start circuit 170. During a start-up phase occurring immediately after application of an input voltage $V_{IN}$ to the input 110, these circuits 150, 160, 170 drive a control voltage $V_{PWM\_Q1}$, which is based upon a ramp voltage $V_{RAMP}$, to the control terminal (e.g., gate) of the first switch $Q_1$. Without referencing this control voltage $V_{PWM\_Q1}$ to the ramp voltage $V_{RAMP}$, the control terminal voltage $V_{PWM\_Q1}$ would be referenced to whatever voltage the first switch $Q_1$ pulls its second terminal (e.g., source) to. Without the setting of the gate reference voltage as described herein, the voltage at the second terminal (voltage node $V_1$) of the first switch $Q_1$ would follow the input voltage $V_{IN}$, minus a relatively small drain-to-source voltage drop across the first switch $Q_1$. Upon application of the input power supply, a sudden increase in the input voltage $V_{IN}$, and the resulting voltage increase at the second terminal (voltage node $V_1$) of the first switch $Q_1$, would cause a sudden spike in the current $I_{Q1}$ flowing into the SCC. The SCC 100 of FIG. 1 prevents such a current spike by applying the ramp voltage $V_{RAMP}$ to the control terminal of the first switch $Q_1$. The resultant voltage $V_{SRC\_RAMP}$ at the second terminal (voltage node $V_1$) of the first switch $Q_1$ follows the ramp voltage $V_{RAMP}$ applied at the control terminal and, therefore, also rises relatively slowly, at least as compared with the rise of the input voltage $V_{IN}$. (This is explained in further detail in the description of FIG. 3.) The current flow $I_{Q1}$ of the SCC 100 is determined by the voltage at the node $V_1$ and the effective resistance of the SCC circuitry downstream from this voltage node $V_1$, i.e., the effective resistance between the voltage node $V_1$ and ground. This effective resistance is based upon resistances of components, e.g., capacitors, inductors, and switches, that are currently within the conduction path from the voltage node $V_1$ to ground. In order to limit the current flow $I_{Q1}$ of the SCC 100, the voltage $V_{SRC\_RAMP}$ at node $V_1$ begins at 0V and slowly ramps up until it reaches, or nearly reaches, the input voltage $V_{IN}$.

The controller 150 generates a pulse-width-modulated (PWM) control signal $V_{PWM\_QA}$ that controls the switches $Q_1$, $Q_3$, $Q_7$, $Q_{10}$ within group A, and a PWM control signal $V_{PWM\_QB}$ that controls the switches $Q_2$, $Q_4$, $Q_8$, $Q_9$ within group B. These PWM control signals $V_{PWM\_QA}$, $V_{PWM\_QB}$ are generated such that the switches of groups A and B are alternatively turned on, as described previously. For example, during a first phase of a switch cycle, the group A control signal $V_{PWM\_QA}$ turns on the first switch $Q_1$, while the group B control signal $V_{PWM\_QB}$ turns off the second switch $Q_2$. During a second phase of the switch cycle, the group A control signal $V_{PWM\_QA}$ turns off the first switch $Q_1$, while the group B control signal $V_{PWM\_QB}$ turns on the second switch $Q_2$. The switch control signals $V_{PWM\_QA}$, $V_{PWM\_QB}$ are typically input to driver circuits for each of the switches. For the SCC 100 of FIG. 1, the control signal $V_{PWM\_QA}$ may be provided to 4 separate drivers which output control signals $V_{PWM\_Q1}$, $V_{PWM\_Q3}$, $V_{PWM\_Q7}$, $V_{PWM\_Q10}$ for the group A switches $Q_1$, $Q_3$, $Q_7$, $Q_{10}$. The control signal $V_{PWM\_QB}$ may be provided to 4 other separate drivers which output control signals $V_{PWM\_Q2}$, $V_{PWM\_Q4}$, $V_{PWM\_Q8}$, $V_{PWM\_Q9}$ for the group B switches $Q_2$, $Q_4$, $Q_8$, $Q_9$. The control signals output from the drivers are then provided to control terminals (e.g., gates) of the switches. For ease of illustration, the drivers and individual control signals are not shown. In alternative implementations, the controller 150 may generate separate control signals for each of the switches, rather than providing common control signals $V_{PWM\_QA}$, $V_{PWM\_QB}$ for the two switch groups, as illustrated in FIG. 1.

The controller 150 is provided with the input voltage $V_1$ from the SCC input 110. Upon detecting that the input voltage $V_{IN}$ has risen above an enable threshold indicating that an input power supply is connected to the SCC input 110, the controller 150 begins operating. This operation begins by generating an enable signal $V_{EN\_RAMP}$ that is provided to the voltage ramp generator 160. In conjunction with or shortly after generating this enable signal $V_{EN\_RAMP}$, the controller 150 begins generating the switch control signals $V_{PWM\_QA}$, $V_{PWM\_QB}$ as described previously. The controller 150 inputs and monitors the SCC output voltage $V_{OUT}$ during the start-up phase, so that the controller 150 may determine when normal steady-stage operation of the SCC may begin. Once the output voltage $V_{OUT}$ reaches an output voltage threshold, the controller 150 may determine that steady-state operation may begin. Alternatively, the controller 150 may compare the input and output voltages $V_{IN}$, $V_{OUT}$ and determine that steady-state operation may commence once the ratio of these voltages reaches some threshold, e.g., $$\frac{V_{IN}}{V_{OUT}} \approx 4.$$

Once the controller 150 determines that steady-state operation may commence, the controller 150 generates a power-good signal $V_{PG}$, which may be used by other power converters or loads that are supplied power from the SCC 100.

Detection that an input power supply has been applied to the input 110 may be performed by an input activity detector that is outside of the controller 150. For example, the above-described detection may be performed directly within the voltage ramp generator 160, rather than within the controller 150. Alternatively, the input activity detector may be a circuit that is not within the controller 150 or the voltage ramp generator 160.

The input voltage enable threshold is typically based upon an expected input voltage $V_{IN}$. For example, if the expected steady-state input voltage $V_{IN}$ is 54V, then the input activity detection may be triggered when a measured voltage at the input 110 reaches 40V.

The controller 150 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 150 may also include memory, e.g., non-volatile memory such as flash, that includes instructions or data for use by the processor circuitry, and one or more timers, e.g., for providing the switch intervals according to the switching frequency so as to generate the switch control signals $V_{PWM\_QA}$, $V_{PWM\_QB}$.

Figure 2:
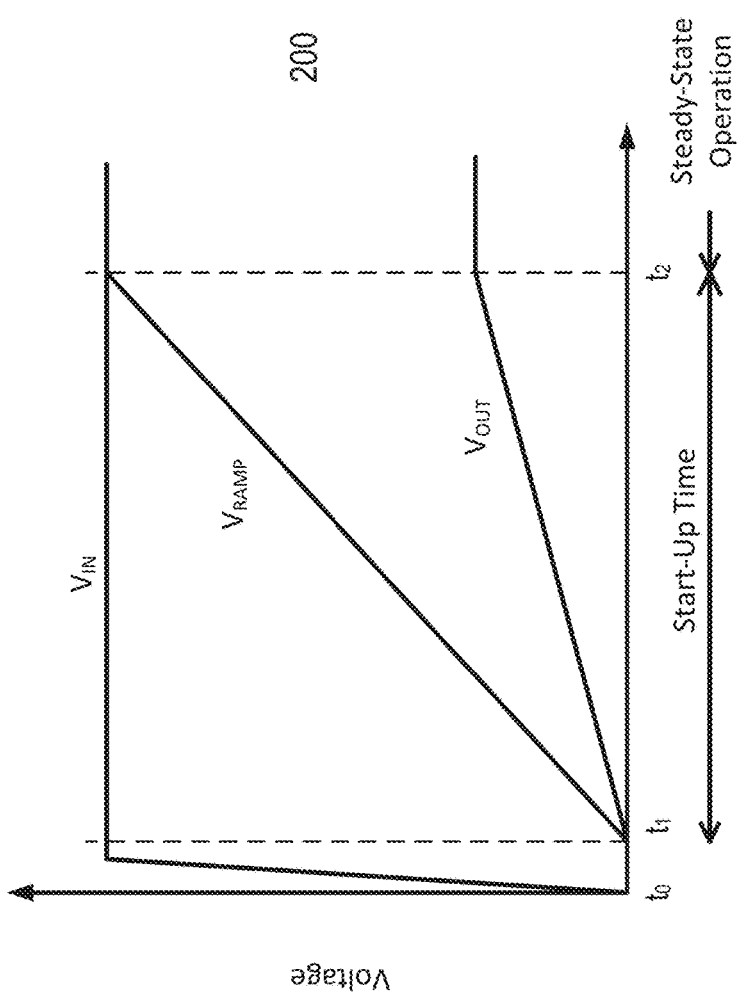
FIG. 2 illustrates waveforms corresponding to input, output, and ramp voltages during a start-up phase of an SCC, such as the SCC of FIG. 1.

FIG. 2 illustrates voltage waveforms 200 within the SCC 100. At time $t_0$, an input power supply is connected to the SCC input 110. The input voltage $V_{IN}$ rises quickly. In response to and shortly after detecting that the input voltage $V_{IN}$ has risen above an input voltage threshold, the controller 150, at time $t_1$, commences start-up operation by enabling the voltage ramp generator 160 using the enable signal $V_{EN\_RAMP}$. The voltage ramp generator 160 then generates a ramped voltage $V_{RAMP}$ that increases from 0V to $V_{IN}$ over the start-up time interval from $t_1$ to $t_2$, as illustrated. The output voltage $V_{OUT}$ is proportional to the ramped voltage $V_{RAMP}$ and, over this same time interval, ramps from 0V to its steady-state voltage value. At time $t_2$, the controller 150 detects that the output voltage $V_{OUT}$ has reached its steady-stage value or, alternatively, that the ratio of the input voltage $V_{IN}$ to the output voltage $V_{OUT}$ has reached an expected down-conversion ratio. Upon such detection, the controller 150 generates a power-good signal $V_{PG}$ indicating that the output voltage $V_{OUT}$ is stable, and steady-state operation of the SCC 100 begins.

The soft-start circuit 170 of FIG. 1 inputs the group A control signal $V_{PWM\_QA}$ and outputs a first driven control signal $V_{PWM\_Q1}$ that controls the first switch $Q_1$. The soft-start circuit 170 additionally inputs the ramp voltage $V_{RAMP}$ generated by the voltage ramp generator 160 and uses it as a reference voltage in the generation of the first driven control signal $V_{PWM\_Q1}$. This first driven control signal $V_{PWM\_Q1}$, based upon the ramp voltage $V_{RAMP}$, is applied to the control terminal (e.g., gate) of the first switch $Q_1$. As explained above, this leads to a reduced voltage $V_{SRC\_RAMP}$ (as compared to the input voltage $V_{IN}$) at the voltage node $V_1$ during the start-up phase, which serves to limit the current $I_{Q1}$ flowing through the SCC 100.

Soft-Start Circuit

Figure 3:
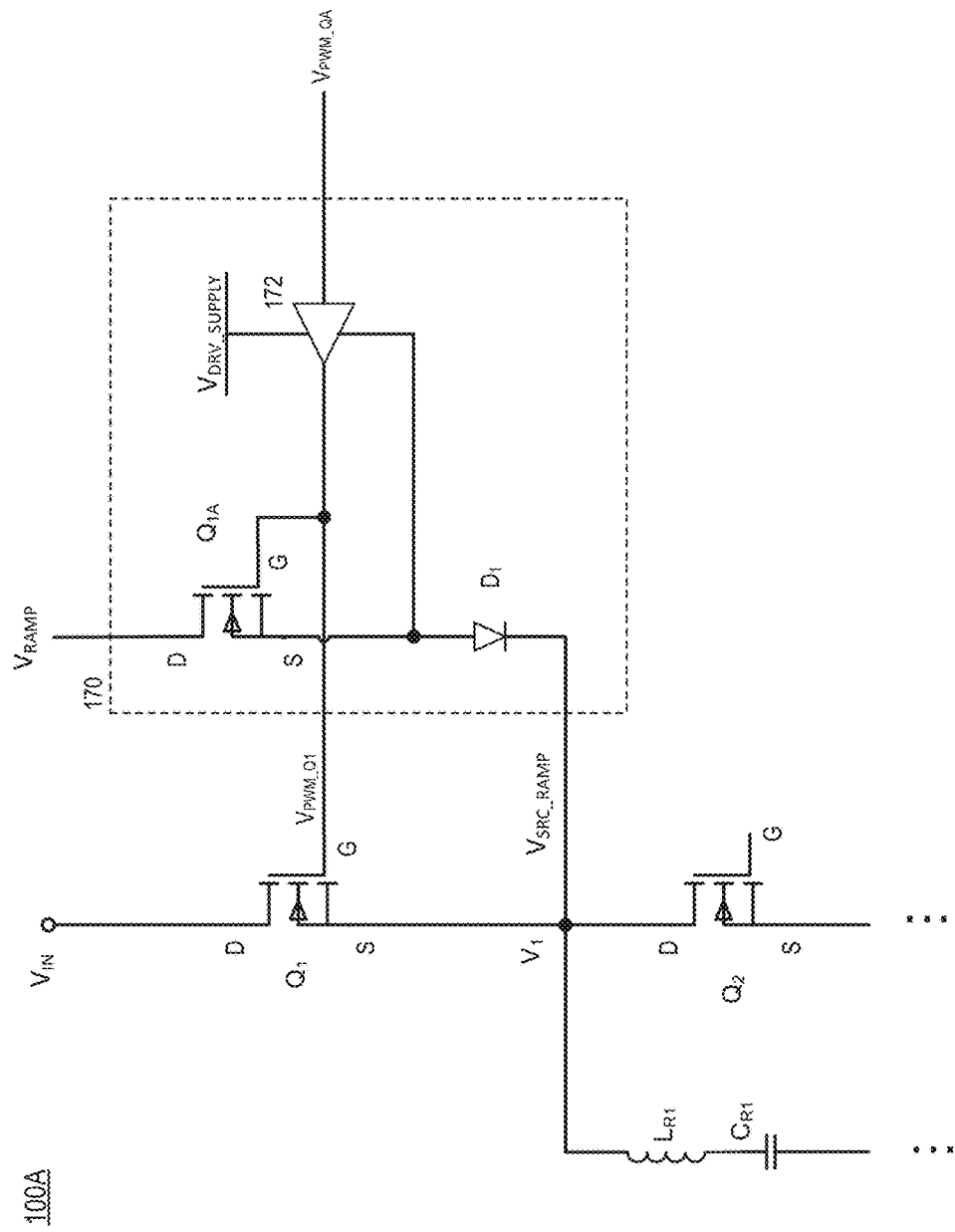
FIG. 3 illustrates a schematic diagram for a soft-start circuit and its external interfaces, as may be included in the SCC of FIG. 1.

FIG. 3 illustrates an example 100A of a soft-start circuit 170, together with relevant portions of the circuitry within the SCC 100. The first and second switches $Q_1$, $Q_2$ of FIG. 3 are MOSFETs. The first terminal of each of these switches is a drain (D), the second terminal is a source (S), and the control terminal is a gate (G), as illustrated.

The soft-start circuit 170 includes a driver 172, a soft-start switch $Q_{1A}$, and a diode $D_1$. The driver 172 inputs the group A PWM control signal $V_{PWM\_QA}$ and outputs a first driven control signal $V_{PWM\_Q1}$ s having appropriate voltages for controlling the soft-start switch $Q_{1A}$ and the first switch $Q_1$. The driver 172 is powered by a supply voltage $V_{DRV\_SUPPLY}$ and has a reference voltage that is coupled to the source of the soft-start switch $Q_{1A}$ and, via the diode $D_1$ when the first and soft-start switches $Q_1$, $Q_{1A}$ are turned off, to the source of the first switch $Q_1$. In a typical circuit, the driver supply voltage $V_{DRV\_SUPPLY}$ is +5V relative to the driver reference, such that the driver 172 provides a PWM output alternating between 0V and 5V, relative to the driver reference. The output of the driver 172 is coupled to the control terminals (gates) of the soft-start switch $Q_{1A}$ and the first switch $Q_1$.

When the first driven control signal $V_{PWM\_Q1}$ turns on the soft-start switch $Q_{1A}$, the ramp voltage $V_{RAMP}$ that is input to the soft-start circuit 170 leads to a ramp voltage $V_{SRC\_RAMP}$ at the voltage node $V_1$. The resultant ramp voltage $V_{SRC\_RAMP}$ at the second terminal (e.g., source) of the first switch $Q_1$ (voltage node $V_1$) serves to limit the current flow through the SCC 100.

The soft-start switch $Q_{1A}$ is illustrated as a MOSFET, but other types of switches may be preferred in some applications. Note that the soft-start switch $Q_{1A}$ is not required to support high current levels, as are the other switches (e.g., $Q_1, \ldots Q_4$) of the SCC 100, and, hence, does not need to be a power switch.

The diode $D_1$ of the soft-start circuit 170 serves to decouple the voltage reference (ground) of the driver 172 from the second terminal (e.g., source) of the first switch $Q_1$ when the first switch $Q_1$ is turned on and the driver reference voltage is connected to the ramp voltage $V_{RAMP}$ by the soft-start switch $Q_{1A}$. In this state and ignoring the insubstantial drain-to-source voltage drop $V_{ds\_Q1A}$ across the soft-start switch $Q_{1A}$, the first driven control signal $V_{PWM\_Q1}$ has a voltage given by $V_{RAMP}$ plus $V_{DRV\_SUPPLY}$ (i.e., $V_{PWM\_Q1}=V_{RAMP}+V_{DRV\_SUPPLY}$). The voltage at the second terminal (e.g., source) of the first switch $Q_1$ is determined by the first driven control signal $V_{PWM\_Q1}$, voltage less the gate-to-source voltage $V_{gs\_Q1}$ of the first switch $Q_1$, which will be a switch threshold voltage $V_{THR}$. This leads to a voltage $V_{SRC\_RAMP}=V_{RAMP}+V_{DRV\_SUPPLY}-V_{THR}$ at the second terminal (e.g., source) of the first switch $Q_1$. For a typical switch threshold voltage $V_{THR}$ of 3V and the previously-mentioned typical driver supply voltage $V_{DRV\_SUPPLY}$ of 5V, the resultant source voltage is $V_{SRC\_RAMP}=V_{RAMP}+$ 2V. With a voltage of $V_{RAMP}$ on its anode side, the diode $D_1$ is reverse-biased such that no current flows through the diode $D_1$, thereby leading to the above-mentioned decoupling of the voltage reference (ground) of the driver 172 from the second terminal (e.g., source) of the first switch $Q_1$.

For the other switching phase, the soft-start switch $Q_{1A}$ is turned off such that the driver reference voltage is no longer coupled to $V_{RAMP}$. The diode $D_1$ now serves to couple the driver reference voltage to the second terminal (e.g., source) of the first switch $Q_1$. As the second switch $Q_2$ is enabled in this switching phase, the voltage at the node $V_1$ will be pulled down by the current flowing to and charging the flying capacitor $C_{FLY1}$. The diode $D_1$ prevents any voltage variations at the node $V_1$ from producing a voltage (e.g., $V_{gs\_Q1}$) that would enable the first switch $Q_1$. Stated alternatively, the diode $D_1$ connects the driver reference voltage to either the ramp voltage $V_{RAMP}$ or to the source voltage node $V_1$, as needed. Note that the diode $D_1$ could be replaced with an appropriately controlled switch.

As described previously, the switches $Q_1, \ldots Q_4$, $Q_7, \ldots Q_{10}$ may be power MOSFETs. Note that during the start-up phase, the drain-to-source voltage $V_{ds\_Q1}$ across the first switch $Q_1$ is large and this MOSFET is operating in its saturation region. For example, if the input voltage $V_{IN}$ is 54V and the voltage ramp $V_{SRC\_RAMP}$ is beginning at 2V, then the first switch must drop 52V across its drain and source terminals. Hence, the first switch $Q_1$ should be chosen such that its breakdown voltage is higher than the expected maximum input voltage $V_{IN}$. The first switch $Q_1$ must also be sized such that it can support the power dissipation required during the start-up phase of the SCC 100, i.e., $I_{Q1}*V_{ds\_Q1}$. Because the current $I_{Q1}$ is based upon the ramp voltage $V_{RAMP}$, the power dissipation of the first switch $Q_1$ is a function of the slope of the ramp voltage $V_{RAMP}$. For a first switch $Q_1$ having a given power rating, a slope of the ramp voltage $V_{RAMP}$ should be set to ensure the power rating is not exceeded.

Voltage Ramp Generator Circuits

Many techniques and circuits may be used to generate the ramp voltage $V_{RAMP}$ within the SCC 100 of FIG. 1. Some exemplary circuits for implementing a voltage ramp generator are described below.

Figure 4B:
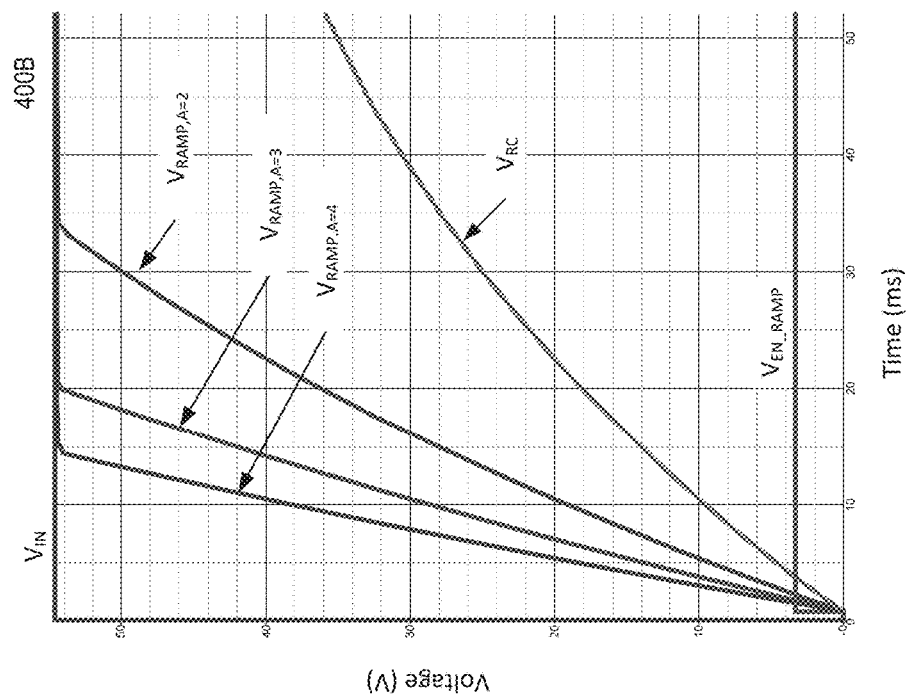
FIG. 4B illustrates voltage waveforms within such a voltage ramp generator.
Figure 4A:
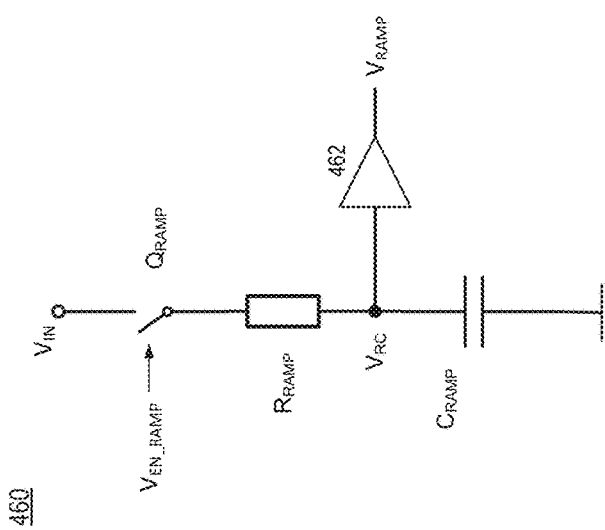
FIG. 4A illustrates a schematic diagram for a voltage ramp generator as may be included in the SCC of FIG. 1.

FIG. 4A illustrates a voltage ramp generator 460 based upon an analog resistor-capacitor (RC) network. The ramp enable signal $V_{EN\_RAMP}$, as generated by the controller 150 upon detecting that an input voltage $V_1$ is available, turns on a ramp switch $Q_{RAMP}$, so as to apply the input voltage $V_1$ to an RC network consisting of a resistor $R_{RAMP}$ and a capacitor $C_{RAMP}$. A voltage at a node $V_{RC}$ connecting the resistor $R_{RAMP}$ and the capacitor $C_{RAMP}$ increases exponentially from 0V beginning when the voltage $V_{IN}$ is applied. An amplifier 462 serves to buffer and amplify the voltage at the node $V_{RC}$, and outputs the ramp voltage $V_{RAMP}$. The voltage at the node $V_{RC}$ rises exponentially and approaches the input voltage $V_{IN}$. Without modification, the voltage at the node $V_{RC}$ will not fully reach the input voltage $V_{IN}$, as desired. A gain, e.g., of A=2, applied by the amplifier 462 ensures that the ramp voltage $V_{RAMP}$ reaches the input voltage $V_{IN}$, and also makes the slope of the ramp voltage $V_{RAMP}$ more linear. The amplifier 462 also serves to isolate the RC network from the soft-start circuit 170, such that the impedance of the soft-start circuit 170 does not affect the ramp voltage $V_{RAMP}$ provided by the RC network. The rate of increase of the voltage at the node $V_{RC}$ is determined by the time constant $z=R_{RAMP}*C_{RAMP}$. The corresponding output voltage $V_{RAMP}$ is determined by this time constant z and the gain A of the amplifier 462.

FIG. 4B illustrates waveforms 400B corresponding to the ramp voltage $V_{RAMP}$ for $R_{RAMP}=100$ KΩ and $C_{RAMP}=470$ nF. The input voltage $V_{IN}$ is applied at time t=0, and immediately rises to 54V. Shortly thereafter, i.e., at approximately t=1 ms, the ramp enable signal $V_{EN\_RAMP}$ is activated and the voltages $V_{RC}$ and $V_{RAM}$ begin to rise. Waveforms corresponding to $V_{RAMP}$ voltages are illustrated for amplifier gains of A=2, A=3, and A=4. It should be appreciated that many voltage ramp generator variations based upon an underlying RC or other passive network are possible. The voltage ramp generator 460 of FIG. 4A has the advantage that it is fairly simple and that the required circuitry is minimal.

Figure 5B:
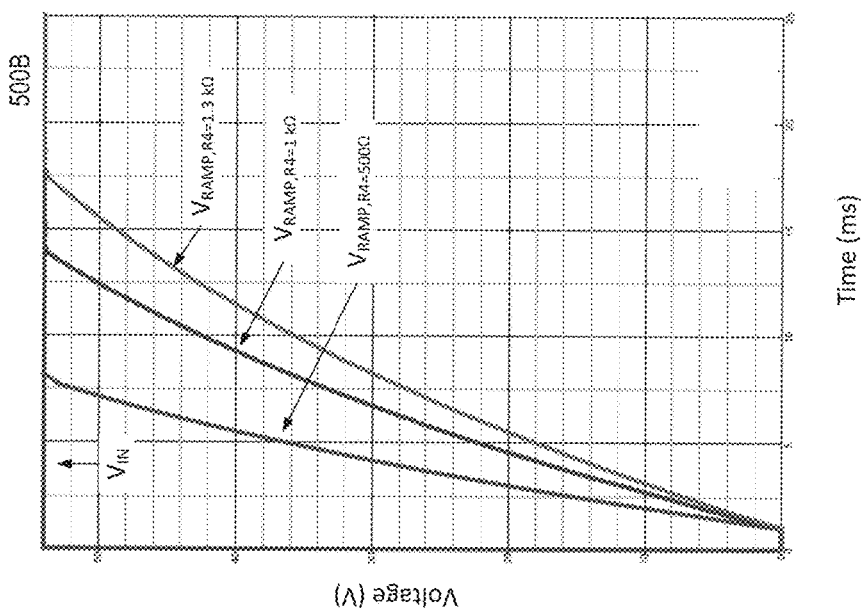
FIG. 5B illustrates voltage waveforms within such a voltage ramp generator.
Figure 5A:
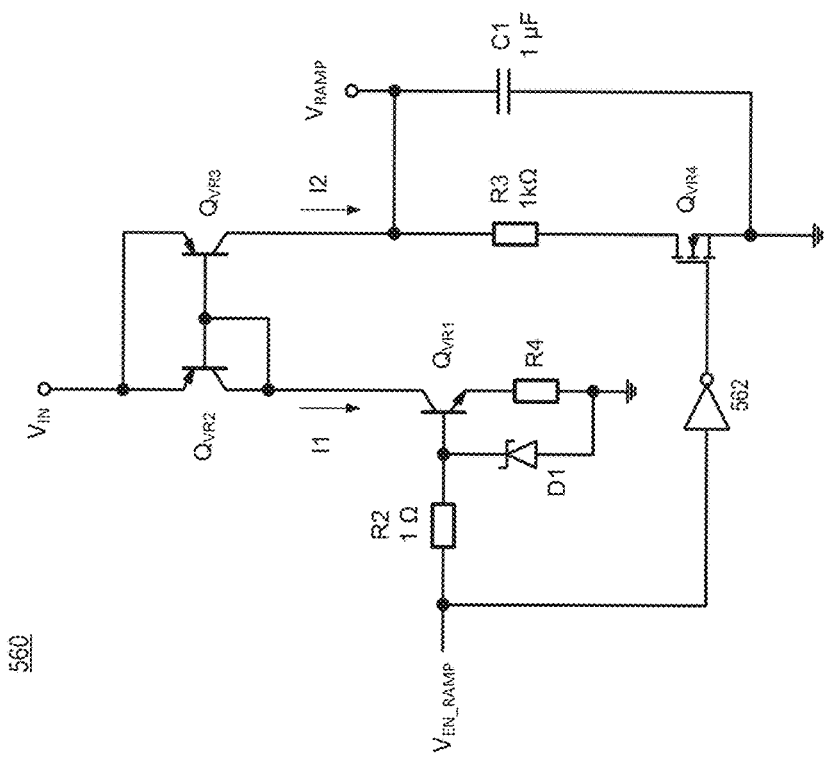
FIG. 5A illustrates a schematic for another voltage ramp generator as may be included in the SCC of FIG. 1.

FIG. 5A illustrates a voltage ramp generator 560 based upon a current source. The ramp enable signal $V_{EN\_RAMP}$, as generated by the controller 150 upon detecting that an input voltage $V_{IN}$ is available, provides a voltage that enables a current source circuit comprised of a first voltage ramp switch $Q_{VR1}$, a resistor R2, a resistor R4 and a Zener diode D1. The first voltage ramp switch $Q_{VR1}$ is an NPN bipolar junction transistor (BJT) having collector, emitter, and base (control) terminals. A current I1 flowing into the collector terminal of the first voltage ramp switch $Q_{VR1}$ is based on the resistance of R4, together with the electrical characteristics of the first voltage ramp switch $Q_{VR1}$ and the Zener diode D1. A Zener voltage (reverse breakdown voltage) of the Zener diode provides a highly stable voltage that is provided across the base-to-emitter junction of the switch $Q_{VR1}$ and the resistor R4. This highly-stable voltage, in turn, leads to a fairly constant current I1 being drawn by the switch $Q_{VR1}$.

The current I1 is drawn through a current mirror comprised of second and third voltage ramp switches $Q_{VR2}$, $Q_{VR3}$, which are PNP BJTs in the illustrated voltage ramp generator 560. The current mirror serves to isolate the current source from any circuitry connected to the voltage ramp generator 560, such that the current source is not affected by the impedance of other circuitry, and vice versa. A second current I2 mirrors the first current I1, and the second current I2 should also be relatively constant. When the voltage ramp generator is enabled by the active voltage ramp enable signal $V_{EN\_RAMP}$, this current I2 flows to the $V_{RAMP}$ node, including the capacitor C1. As the capacitor C1 is charged, the ramp voltage $V_{RAMP}$ gradually increases until it reaches the input voltage $V_{IN}$. A resistor R3 and a fourth voltage ramp switch $Q_{VR4}$, which is driven by an inverter 562, serve to discharge the capacitor C1 when the ramp enable signal $V_{EN\_RAMP}$ is inactive. This ensures that the voltage at $V_{RAMP}$ begins at zero when the voltage ramp generator is activated.

FIG. 5B illustrates waveforms 500B corresponding to the ramp voltage $V_{RAMP}$ for different values of the resistor R4. A first $V_{RAMP}$ curve, denoted $V_{RAMP,R4=500\Omega}$, corresponds to a case in which the resistor R4 has a fairly low resistance, which leads to high currents I1, I2 and a quickly increasing ramp voltage. A second $V_{RAMP}$ curve, denoted $V_{RAMP,R4=500\Omega}$, corresponds to a case in which the resistor R4 has a higher resistance, which leads to lower currents I1, I2 and a more slowly increasing ramp voltage. A third $V_{RAMP}$ curve, denoted $V_{RAMP,R4=1.3k\Omega}$, corresponds to a case in which the resistor R4 has a still higher resistance, which leads to yet lower currents I1, I2 and a ramp voltage that increases still more slowly.

The nonlinearity of the ramp voltages generated by the above voltage ramp generators 460, 560 presents a potential disadvantage for these circuits. Another potential disadvantage is that the slope of the ramp voltage $V_{RAMP}$ is typically not adaptable. The voltage ramp generator of FIG. 6A addresses this issues, at the potential expense of added circuitry.

Figure 6B:
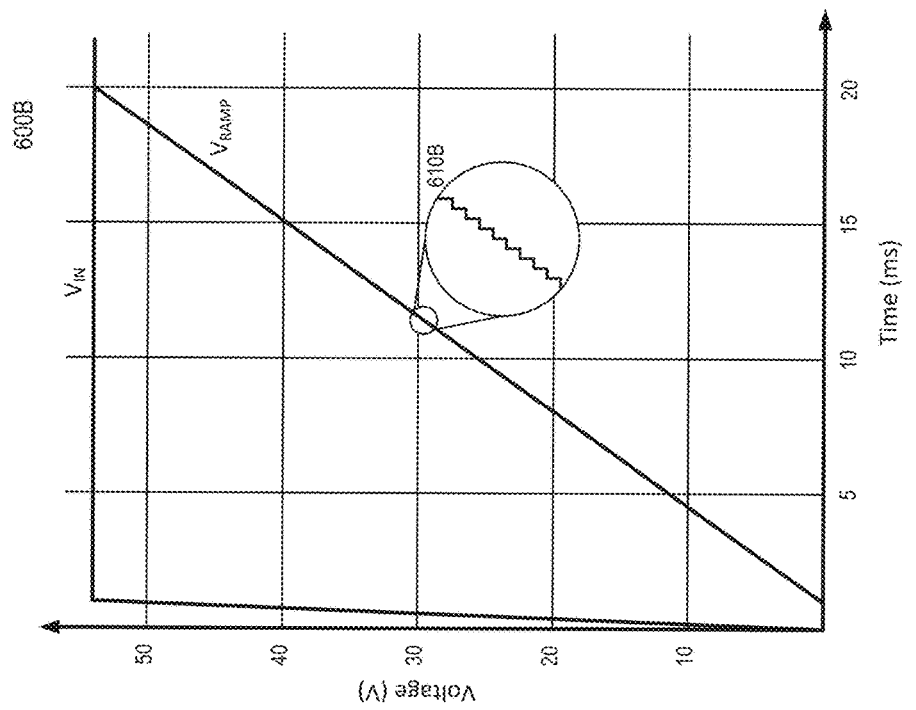
FIG. 6B illustrates voltage waveforms within such a voltage ramp generator.
Figure 6A:
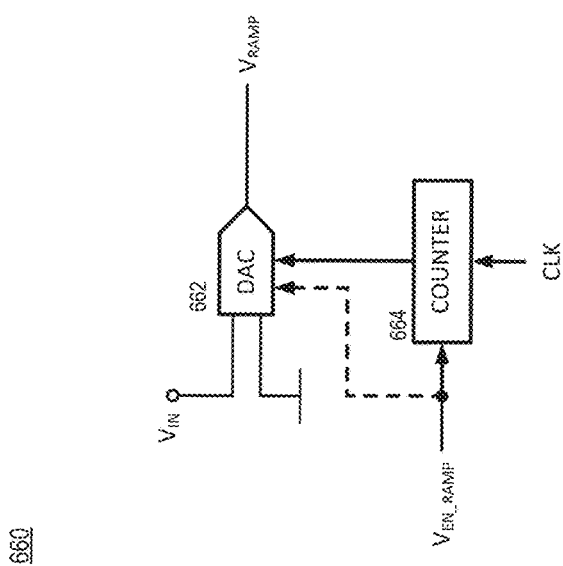
FIG. 6A illustrates a schematic for yet another voltage ramp generator as may be included in the SCC of FIG. 1.

FIG. 6A illustrates a voltage ramp generator 660 based upon a digital-to-analog converter (DAC) 662. The ramp enable signal $V_{EN\_RAMP}$, as generated by the controller 150 upon detecting that an input voltage $V_{IN}$ is available, enables a counter 664 and, in some implementations, the DAC 662. The counter 664 then begins counting from 0 to some maximum value, at which point the counting stops. For example, an 8-bit counter would count from 0 to 255. The count is incremented upon each cycle of an input clock (CLK). The count is output from the counter 664 and input to the DAC 662. The DAC 662 outputs a voltage $V_{RAMP}$ based upon the count. The DAC 662 is supplied with the input voltage $V_{IN}$. As the count increases, the ramp voltage $V_{RAMP}$ increases until the count reaches its maximum value and the ramp voltage $V_{RAMP}$ reaches $V_{IN}$. At this point, the counter 664 may be disabled, e.g., to save power, or the counter 664 may simply maintain the maximum output count value. Alternatively, the output voltage $V_{RAMP}$ from the DAC 662 may be latched to the input voltage $V_{IN}$, so that the DAC 662 may be disabled to save power In some implementations, the DAC 662 may have a dynamic range that is considerably smaller than the input voltage $V_{IN}$, in which case an amplifier may be required at the DAC output. (For ease of illustration, such an amplifier is not shown.) For example, a DAC may generate output voltages between 0 and 5V. An amplifier having a gain of A=10.8 may then be used to amplify the DAC output and provide the ramp voltage $V_{RAMP}$, so that $V_{RAMP}$ varies between 0V and a 54V level expected at the input voltage $V_{IN}$.

FIG. 6B illustrates waveforms 600B for the ramp voltage $V_{RAMP}$ as output from the voltage ramp generator 660. Note that the ramp voltage $V_{RAMP}$ appears highly linear, unlike the voltage produced by the voltage ramp generator 460 based upon an RC network. An expanded view 610B of the $V_{RAMP}$ waveform shows that it has a staircase shape, wherein each step corresponds to an increase due to an increment in the count While the voltage ramp generator 660 described above regularly and monotonically increases the ramp voltage $V_{RAMP}$, the ramp voltage $V_{RAMP}$ could be controlled in a more dynamic way. For example, the controller 150 could measure the voltage $V_{ds\_Q1}$ across and the current $I_{Q1}$, through the first switch $Q_1$, and adjust the ramping of the ramp voltage $V_{RAMP}$ to ensure power dissipation requirements of the first switch $Q_1$ are being met.

While the voltage ramp generator 160 is shown as a separate circuit within the SCC 100 of FIG. 1, the voltage ramp generator may be included with a controller of the SCC 100. The largely digital DAC-based voltage ramp generator 660 of FIG. 6A is particularly amenable to inclusion within a controller such as the controller 150 of FIG. 1.

For any voltage ramp generator circuit, the slope of the generated voltage ramp $V_{RAMP}$ must be chosen to ensure that the current is adequately limited for the SCC 100. A slow ramp voltage $V_{RAMP}$ yields slowly-increasing current and decreases the electrical stress on the switches and capacitors within the SCC 100, but comes at the expense of an undesired lengthy start-up phase. The slope of the ramp voltage $V_{RAMP}$, must be chosen to meet maximum current requirements for the components of the SCC 100, and to keep the start-up time of the SCC 100 reasonably short.

Alternative Switched-Capacitor Converter Circuit Topologies

The soft-starting of an SCC has been described in the context of the SCC 100 of FIG. 1, which down-converts the input voltage $V_{IN}$, by a factor of 4 and includes resonant inductors in its legs. However, the soft-start circuitry, including the voltage ramp generator 160 and the soft-start circuit 170, may be similarly applied to other SCC topologies. For such variations, the ramp voltage $V_{RAMP}$ is similarly generated and applied to the control terminal (e.g., gate) of the first power switch within an SCC, wherein the first power switch is coupled to an input power supply. Some example variations of the SCC 100 of FIG. 1 are described below, but it should be understood that many other SCC variations fall within the scope of the claimed inventions.

Figure 7:
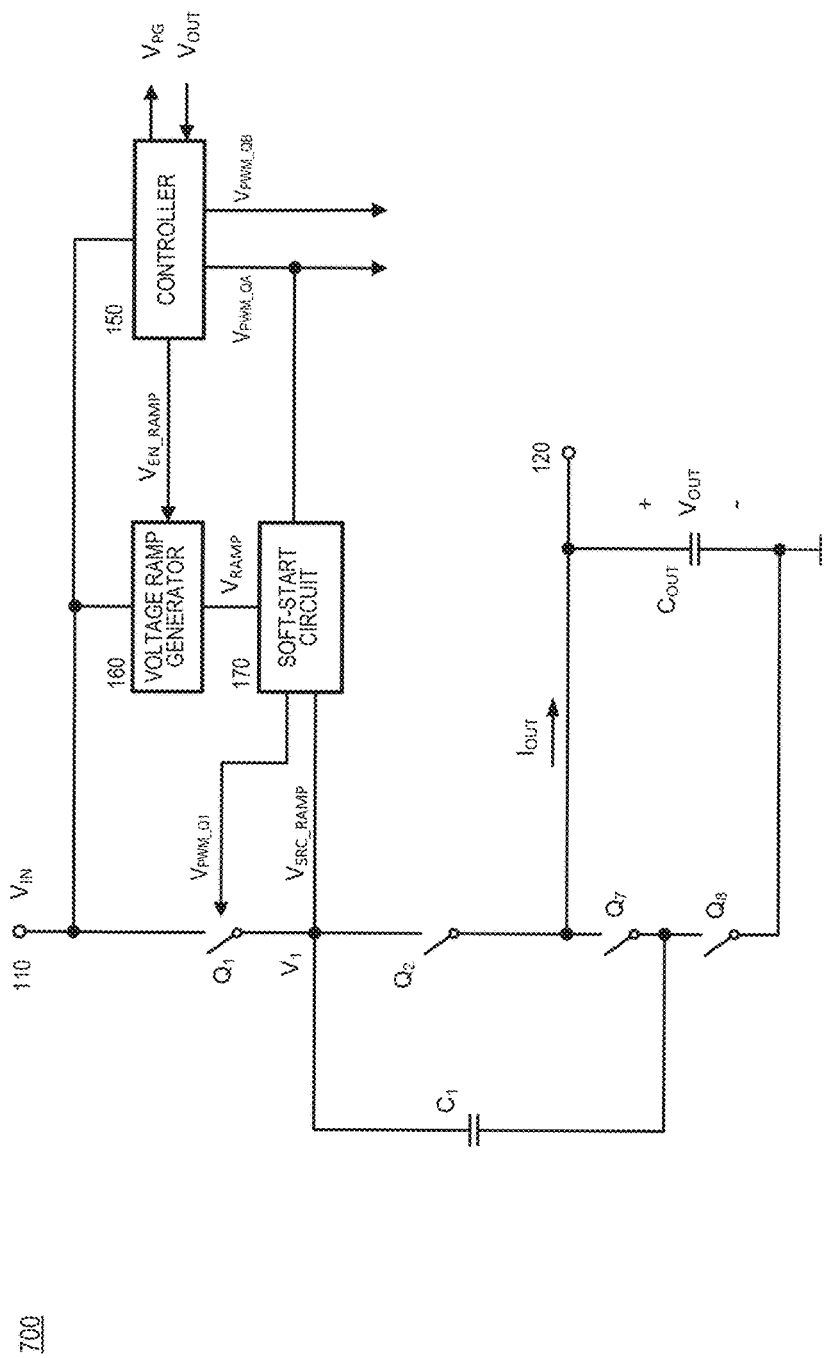
FIG. 7 illustrates a schematic diagram for an alternative SCC topology that includes circuitry for limiting current flow during a start-up phase of the SCC.

FIG. 7 illustrates a 2:1 SCC 700 having no resonant inductors. As compared with the SCC 100 of FIG. 1, the inductors $L_1$, $L_2$, the capacitors $C_2$, $C_{FLY1}$ corresponding to the second switch stage, the switches $Q_3$, $Q_4$ of the second switch stage, and the switches $Q_9$, $Q_{10}$ of the second rectifier branch are deleted. Otherwise, the circuitry and control of the SCC 700 are largely the same as that of the SCC 100 of FIG. 1.

Figure 8:
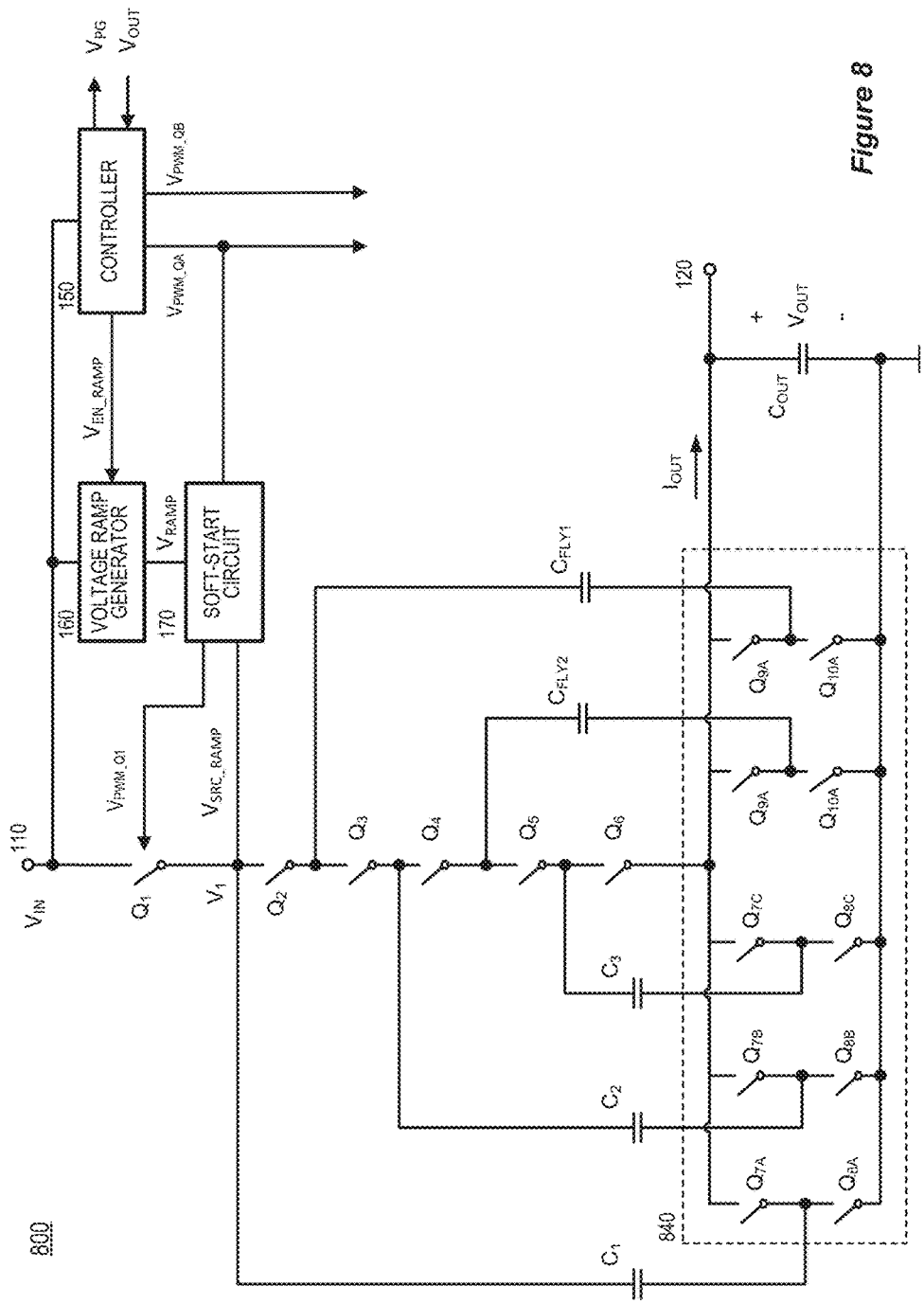
FIG. 8 illustrates a schematic diagram for another alternative SCC topology that includes circuitry for limiting current flow during a start-up phase of the SCC.

FIG. 8 illustrates a 6:1 SCC 800 having additional rectifier branches within its rectifier 840. The SCC 800 includes an additional switch stage that has fifth and sixth switches $Q_5$, $Q_6$. An additional capacitor $C_3$ and an additional flying capacitor $C_{FLY2}$ are also included and couple the additional switch stage to the rectifier 840. The rectifier 840 of FIG. 8 includes rectifier branches dedicated to each of the legs of the SCC 800, rather than using a common rectifier branch to support multiple legs as in the SCC 100 of FIG. 1.

Method for Soft-Starting a Switched-Capacitor Converter

Figure 9:
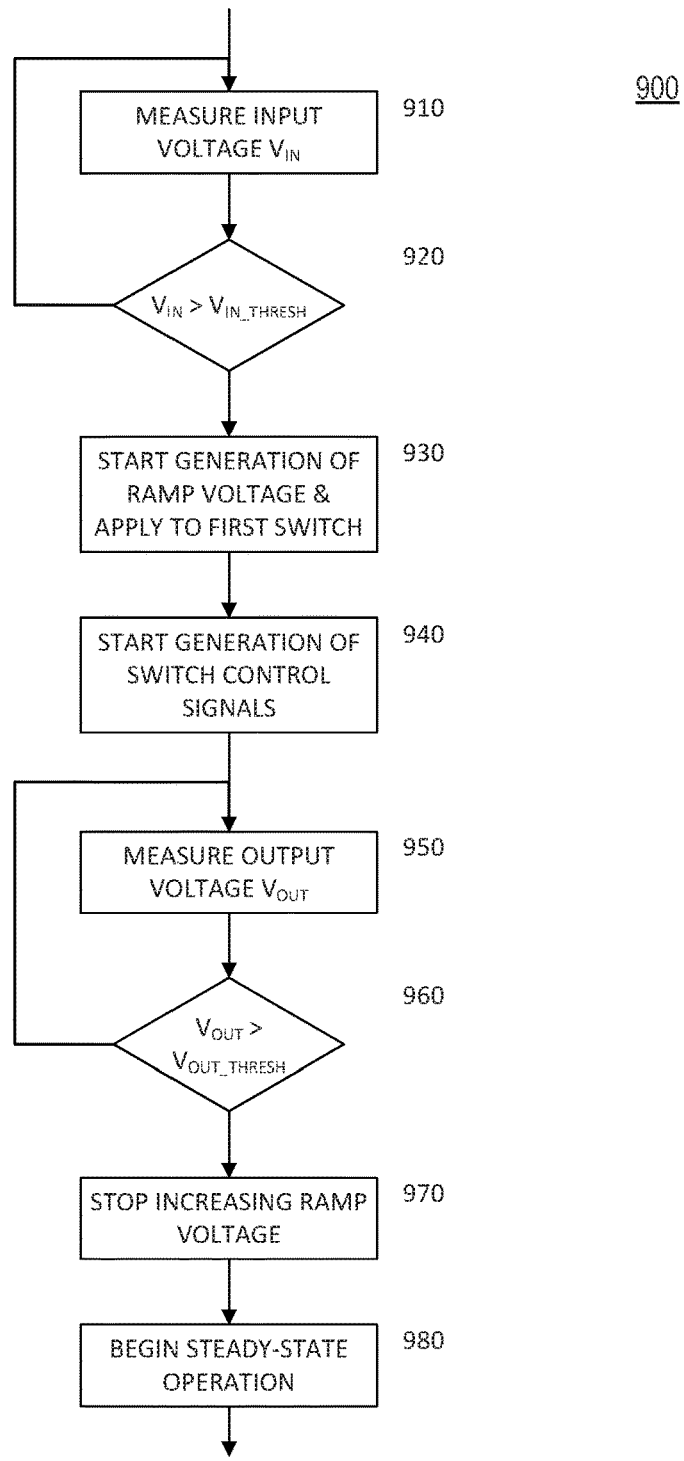
FIG. 9 illustrates a method for limiting the current within an SCC during a start-up interval before the SCC enters steady-stage operation.

FIG. 9 illustrates a method 900 for soft-starting a switched-capacitor converter (SCC) such as that illustrated in FIG. 1. This method may be implemented within an SCC that converts power provided at an input into power at an output. Such an SCC includes a rectifier at the output and a first switch stage that is interposed between the input and the rectifier. The first switch stage comprises a first and a second switch connected in series, wherein the first switch has a first terminal that is coupled to the input, a second terminal that is coupled to the second switch, and a control terminal. A first capacitor couples the first switch stage to the rectifier.

During a start-up phase of the SCC, a voltage $V_{IN}$ at the input is measured 910. This input voltage $V_{IN}$ is compared 920 against an input voltage threshold $V_{IN\_THRESH}$ that indicates whether the input voltage $V_{IN}$ is adequate for commencing operation of the SCC. Once the input voltage $V_{IN}$ exceeds this threshold voltage $V_{IN\_THRESH}$, generation of a ramp voltage is started 930 and applied to the control terminal of the first switch. Additionally, switch control signals, e.g., PWM waveforms, are generated 940 for the switches within the SCC. (It should be appreciated that steps 930, 940 could be swapped in order, but typically are executed at the same time.) Such operation, including the ramping of the voltage applied to the first switch, continues until the output voltage $V_{OUT}$ is sufficient to maintain steady-state operation of the SCC. This determination is made by measuring 950 the output voltage $V_{OUT}$ and comparing 960 it against an output voltage threshold $V_{OUT\_THRESH}$. In an alternative comparison (not illustrated), the ratio of the input voltage $V_{IN}$ to the output voltage $V_{OUT}$ may be compared against the expected down-conversion ratio of the SCC (e.g., 4 for the SCC 100 of FIG. 1). Once the output voltage $V_{UT}r$ exceeds this threshold $V_{OUT\_THRESH}$ (or the $V_{IN}$-to-$V_{OUT}$ ratio reaches the expected down-conversion ratio), ramping of the ramp voltage ceases 970, and normal steady-state operation of the SCC begins 980. The steady-state operation may be indicated by generating a "power good" signal that can be used by power converters or loads that are supplied by the SCC.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A switched-capacitor converter comprising:
    an input for coupling to an input power supply;
    an output for providing power to a load;
    a first switch stage comprising a first switch and a second switch connected in series and interposed between the input and the output, the first switch comprising a first terminal that is coupled to the input, a second terminal that is coupled to the second switch, and a control terminal;
    a first capacitor which couples the first switch stage to the output;
    a controller operable to generate a first control signal for controlling the first switch and a second control signal for controlling the second switch, such that the first and second switches are alternately switched;
    an input activation detector operable to generate an input activation signal based upon an input voltage at the input, wherein the input activation signal indicates that power is being supplied at the input;
    a voltage ramp generator operable to generate a ramped voltage responsive to receiving the input activation signal, wherein the ramped voltage increases from a minimum ramp voltage to a maximum ramp voltage, and the voltage ramp generator limits a slope of the ramped voltage to be less than a slope of the input voltage occurring at an activation of the input voltage; and
    a soft-start circuit operable to set a voltage at the second terminal of the first switch based upon the ramped voltage.

2. The switched-capacitor converter of claim 1, further comprising:
    a rectifier at the output.

3. The switched-capacitor converter of claim 1, wherein the soft-start circuit comprises a soft-start switch having a first soft-start terminal coupled to the ramped voltage, a second soft-start terminal that provides a switch control reference voltage for the first switch, and a soft-start control terminal.

4. The switched-capacitor converter of claim 3, wherein the soft-start switch is controlled by the first control signal which also controls the first switch.

5. The switched-capacitor converter of claim 3, further comprising:
    a first gate driver that inputs the first control signal and outputs a first driven control signal that is coupled to the first control terminal of the first switch and the first soft-start control terminal, wherein the first driven control signal provides a sufficient voltage for turning on the first switch and the first soft-start switch when the first control signal provides an active signal level.

6. The switched-capacitor converter of claim 3, wherein the soft-start circuit further comprises a soft-start diode that couples the second soft-start terminal to the second terminal of the second switch.

7. The switched-capacitor converter of claim 1, wherein the voltage ramp generator is coupled to the input and the ramped voltage is based upon the input voltage.

8. The switched-capacitor converter of claim 7, wherein the maximum ramp voltage generated by the voltage ramp generator is the input voltage once the input voltage is active and has reached a steady-state voltage level.

9. The switched-capacitor converter of claim 1, wherein the voltage ramp generator comprises a resistor and a capacitor, and the slope of the ramped voltage is based upon a resistance of the resistor and a capacitance of the capacitor.

10. The switched-capacitor converter of claim 1, wherein the voltage ramp generator comprises a digital-to-analog converter (DAC) which provides the ramped voltage, wherein the DAC periodically increases the ramped voltage until the ramped voltage reaches the maximum ramp voltage.

11. The switched-capacitor converter of claim 10, wherein the maximum ramp voltage is the same as the input voltage once the input voltage is active and has reached a steady-state voltage level.

12. The switched-capacitor converter of claim 1, wherein during a ramp-up interval when the ramped voltage increases from the minimum ramp voltage to the maximum ramp voltage, the ramped voltage at a given instant of time determines a current flowing through the first switch at that given instant of time.

13. The switched-capacitor converter of claim 1, wherein the minimum ramp voltage is zero.

14. The switched-capacitor converter of claim 1, wherein the controller includes the input activity detector, and the input activation signal is generated responsive to detecting that the input voltage is above an input activity threshold voltage.

15. The switched-capacitor converter of claim 1, wherein the controller senses the input voltage and an output voltage at the output, and enables power to an output load in response to detecting that a ratio of the sensed input voltage to the sensed output voltage has reached a down-conversion ratio of the switched-capacitor converter.

16. The switched-capacitor converter of claim 1, further comprising:

a first inductor connected in series with the first capacitor, such that the serially-connected first inductor and first capacitor couple the first switch stage to the output.

17. The switched-capacitor converter of claim 1, wherein the first switch stage is directly coupled to the output, and the switched-capacitor converter down-converts the input voltage by a factor of two.

18. The switched-capacitor converter of claim 1, further comprising:
 a second switch stage comprising a third switch and a fourth switch connected in series and interposed between the first switch stage and the output, wherein the third switch is controlled by the first control signal and the fourth switch is controlled by the second control signal; and
 a second capacitor which couples the second switch stage to the output.

19. The switched-capacitor converter of claim 1, wherein the first switch is a power metal-oxide semiconductor field-effect transistor (MOSFET), and wherein the first terminal is a drain, the second terminal is a source, and the control terminal is a gate.

20. A method for limiting a current within a switched-capacitor converter (SCC) at its start-up, the SCC comprising an input, an output, a first switch stage comprising a first switch and a second switch connected in series and interposed between the input and the output, the first switch comprising a first terminal that is coupled to the input, a second terminal that is coupled to the second switch, and a control terminal, and a first capacitor interposed between the first switch stage to the output, the method comprising:
 detecting that an input voltage at the input has risen above an activation threshold which indicates that the input is supplying power to the SCC;
 responsive to the detecting, generating a ramp voltage having a slope that is less than a slope of the input voltage as it rises during activation of the input;
 setting a voltage at the second terminal of the first switch based upon the ramp voltage.

21. The method of claim 20, wherein the ramp voltage increases to a maximum voltage that is the same as the input voltage when the input voltage has reached a steady-state voltage level.

22. The method of claim 20, wherein the ramp generator further comprises a digital to analog converter (DAC), the method further comprising:
 incrementing a counter that is coupled to the DAC; and
 updating an output of the DAC and providing the DAC output as the ramped voltage.

* * * * *